US006861172B2

(12) United States Patent
Ohtani et al.

(10) Patent No.: US 6,861,172 B2
(45) Date of Patent: Mar. 1, 2005

(54) CURRENT-COLLECTING STRUCTURE IN FUEL CELL SYSTEM

(75) Inventors: Teruyuki Ohtani, Wako (JP); Masao Utsunomiya, Wako (JP); Makoto Tsuji, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 590 days.

(21) Appl. No.: 09/977,189

(22) Filed: Oct. 16, 2001

(65) Prior Publication Data

US 2002/0098403 A1 Jul. 25, 2002

(30) Foreign Application Priority Data

Oct. 16, 2000 (JP) ........................................ 2000-315471

(51) Int. Cl.⁷ ............................................. H01M 8/02
(52) U.S. Cl. .......................... 429/37; 429/12; 429/27; 429/30; 429/32; 429/33; 429/34; 429/37; 429/40; 429/41; 429/44; 429/161
(58) Field of Search ........................... 429/12, 27, 30, 429/32, 33, 34, 36, 37, 40, 41, 44, 161, 232

(56) References Cited

U.S. PATENT DOCUMENTS 5,707,755 A * 1/1998 Grot .............................. 429/40
6,277,513 B1 * 8/2001 Swathirajan et al. .......... 429/44

* cited by examiner

*Primary Examiner*—Randy Gulakowski
*Assistant Examiner*—Gentle E. Winter

(57) ABSTRACT

A current-collecting structure in a fuel cell system includes conductive separators, current-collecting plates pressed toward the conductive separators, a plurality of good conductors dispersed between the conductive separators and the current-collecting plates and adapted to be deformed under the pressing to come into close contact with the conductive separators and the current-collecting plates, and a conductive binder. The conductive binder fills vacant spaces among the good conductors, the conductive separators and the current-collecting plates. The current-collecting structure in a fuel cell system provides a decreased contact resistance between the conductive separator and the current-collecting plate.

8 Claims, 5 Drawing Sheets

CURRENT-COLLECTING STRUCTURE IN FUEL CELL SYSTEM

BACKGROUND OF THE INVENTION

1. Field of the Invention

The present invention relates to a fuel cell and, more particularly, to a fuel cell system that includes a current-collecting structure for generation of a power by a cell stack and outputting of generated power.

2. Description of the Related Art

A conventionally known current-collecting structure of a fuel cell includes conductive separators formed at opposite ends of a cell stack, and current-collecting plates pressed into direct contact with the conductive separators.

In the known current-collecting structure, however, the conductive separator and the current-collecting plate can look macroscopically like they are in close contact with each other, but microscopically, a large number of gaps exist between the conductive separator and the current-collecting plate. As a result of these microscopic gaps, a problem exists with the known current-collecting structure, in that the contact resistance between the conductive separator and the current-collecting plate is increased, which results in a reduction in power-generating efficiency of the cell stack.

SUMMARY OF THE INVENTION

It is an object of the present invention to provide a current-collecting structure in a fuel cell system, wherein the contact resistance between a conductive separator and a current-collecting plate can be decreased.

It is another object of the present invention to provide a current-collecting structure in a fuel cell system, wherein the power-generating efficiency of the fuel cell system can be enhanced.

To achieve the above objects, according to the present invention, there is provided a current-collecting structure in a fuel cell system, the current-collecting structure including conductive separators, current-collecting plates pressed toward the conductive separators, a plurality of good conductors that are dispersed between the conductive separators and the current-collecting plates, and that are deformed under the pressing to come into close contact with the conductive separators and the current-collecting plates, and a conductive binder which fills vacant spaces between the good conductors, the conductive separators, and the current-collecting plates.

With the above arrangement, most of the vacant spaces between the current-collecting plates and the conductive separators can be filled with the plurality of deformed good conductors, and the remaining vacant spaces can be filled with the conductive binder, whereby the current-collecting plates and the conductive separators can be electrically connected with a wider area. Thus, it is possible to decrease the contact resistance between the current-collecting plates and the conductive separators. In addition, each of the good conductors is retained between the current-collecting plate and the conductive separator by the conductive binder, which prevents the good conductors from falling out from between the current-collecting plate and the conductive separator.

BRIEF DESCRIPTION OF THE DRAWING FIGURES

DETAILED DESCRIPTION OF THE PREFERRED EMBODIMENT

Figure 1:
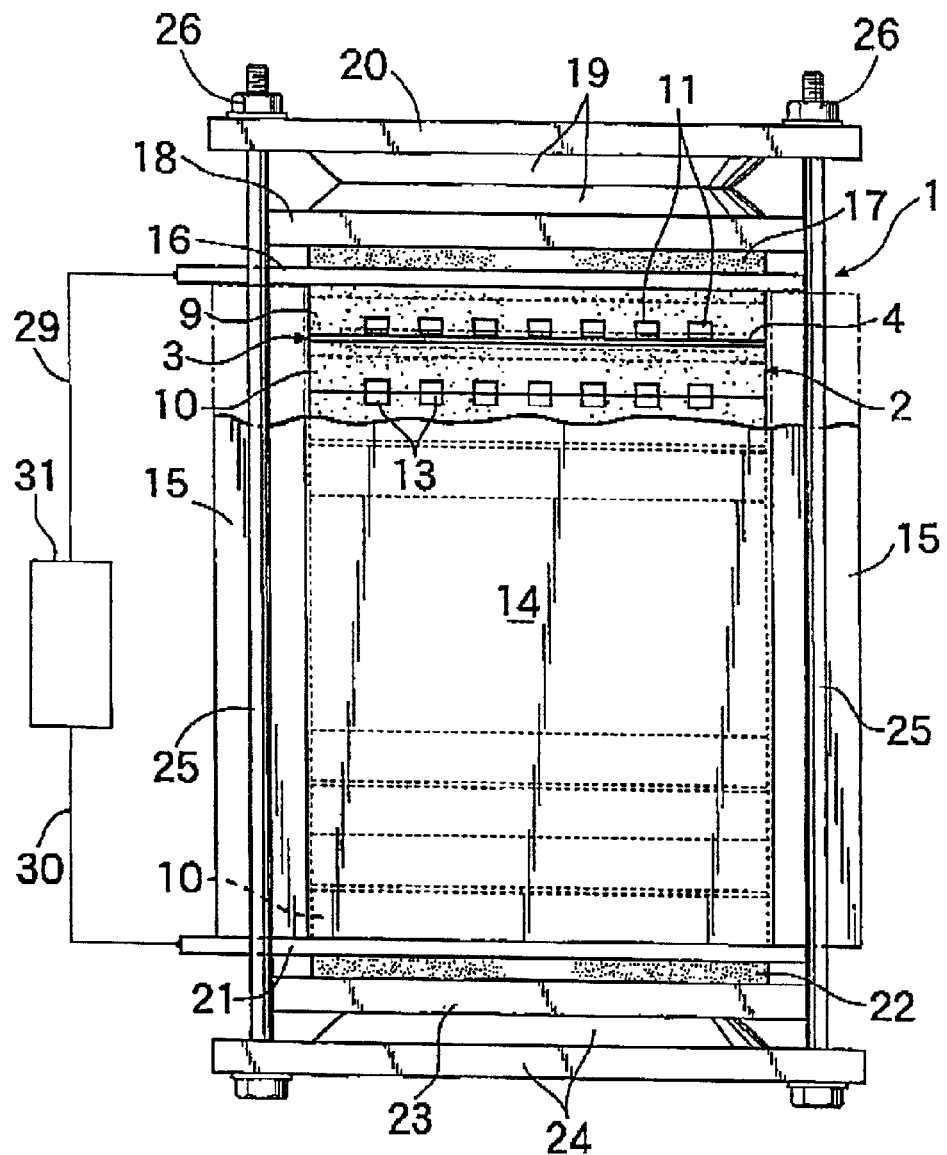
FIG. 1 is a broken front view of a solid polymer fuel cell system according to an exemplary embodiment of the present invention.
Figure 2:
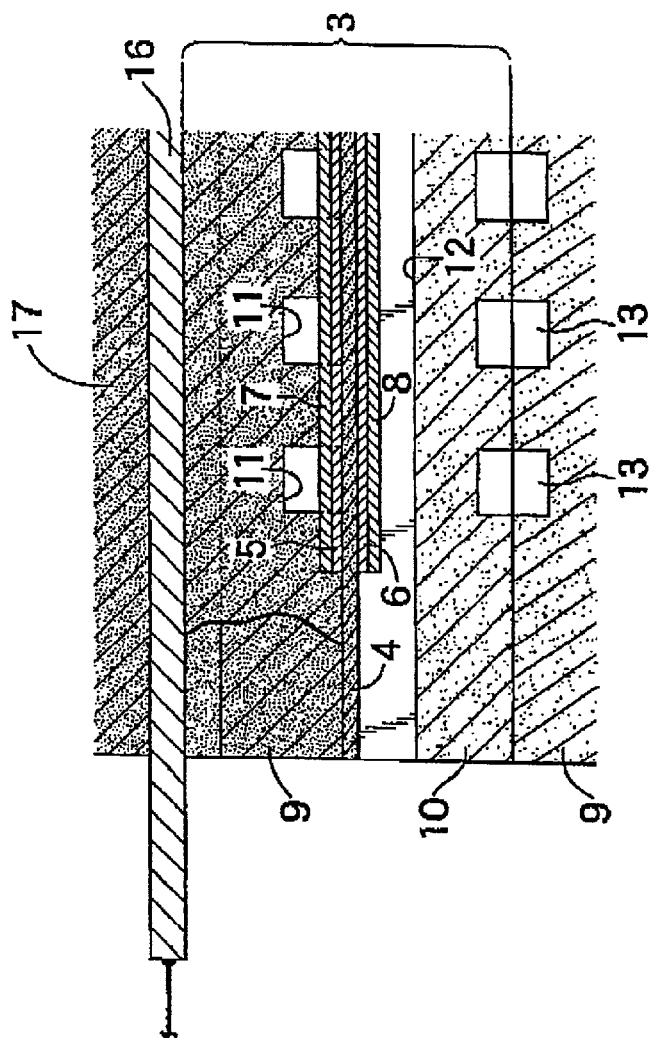
FIG. 2 is an enlarged sectional view of a portion of the solid polymer fuel cell system shown in FIG. 1.

Referring to FIGS. 1 and 2, a solid polymer fuel cell system 1 includes a prismatic cell stack 2, which is formed of a plurality of cells 3 laminated one on another. Each of the cells 3 comprises an electrolyte membrane 4, an air electrode 5 and a fuel electrode 6 provided in close contact with opposite sides of the electrolyte membrane 4, respectively, a pair of diffusion layers 7 and 8 provided in close contact with both the electrodes 5 and 6, respectively, and conductive separators 9 and 10 provided in close contact with both the diffusion layers 7 and 8, respectively.

The electrolyte membrane 4 is formed of a polymer ion-exchange component having a proton-conductivity. Each of the air electrode 5 and the fuel electrode 6 comprises a plurality of catalyst grains having a plurality of platinum grains carried on surfaces of carbon black grains, and a binder.

Each of the diffusion layers 7 and 8 is formed of a porous carbon paper, a carbon plate or the like, and the conductive separators 9 and 10 are each formed of graphitized carbon to have the same form. Air is supplied to a plurality of grooves 11 provided in the conductive separator 9 on the side of the air electrode 5 and opposed to the diffusion layer 7, and hydrogen is supplied to a plurality of grooves 12 provided in the conductive separator 10 on the side of the fuel electrode 6 and opposed to the diffusion layer 8 in an intersecting relation to the grooves 11. A plurality of bores 13 are defined between the conductive separators 9 and 10 provided in the adjacent cells 3 to come into contact with each other, and are used as cooling-water passages.

The periphery of the cell stack 2 is covered with a pair of air manifolds 14 and a pair of fuel manifolds 15. A cooling-water manifold (not shown) is connected to each of the bores 13.

A current-collecting plate 16, an electrically insulating plate 17, an end plate 18, a Belleville spring 19 and a clamp plate 20 are disposed above the conductive separator 9, and constitute an upper end portion of the cell stack 2. These parts of the upper end portion are disposed sequentially in the named order from the side of the conductive separator 9. Similarly, a current-collecting plate 21, an electrically insulating plate 22, an end plate 23 and a clamp plate 24 are disposed below the conductive separator 10, and constitute a lower end portion of the cell stack 2. These parts of the lower end portion are disposed sequentially in the named order from the side of the separator 10. The clamp plates 20 and 24 are clamped to each other by bolts 25 and nuts 26 disposed at four corners of the cell stack 2.

The current-collecting plates 16 and 21 are pressed toward the corresponding opposed conductive separators 9 and 10 by clamping forces provided by four sets of the bolts 25 and the nuts 26, whereby the current-collecting plates 16 and 21 and the conductive separators 9 and 10 are electrically connected to each other.

Figure 3:
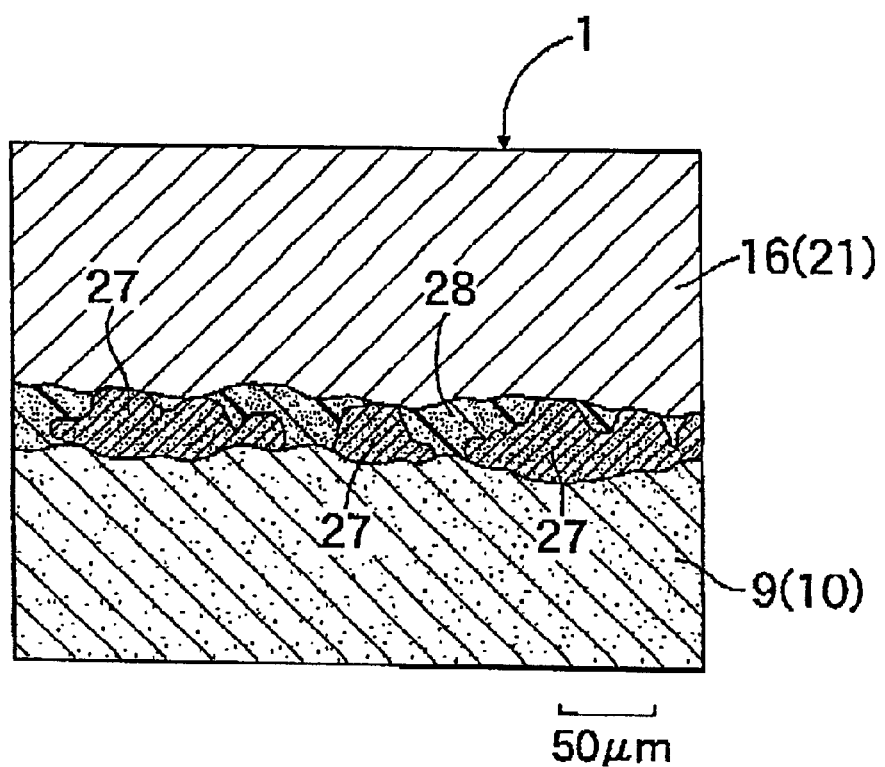
FIG. 3 is an enlarged view of a portion of a current-collecting structure shown in FIG. 2.

To reduce the contact resistance between the current-collecting plates 16 and 21 and the conductive separators 9 and 10 electrically connected to each other, a structure such as that shown in the exemplary embodiment of FIG. 3 is used.

As shown in FIG. 3, a plurality of good conductors 27 are dispersed between the current-collecting plates 16 and 21 and the conductive separators 9 and 10 and adapted to be deformed under the pressing by the clamping forces to come into close contact with the current-collecting plates 16 and 21 and the conductive separators 9 and 10. Vacant spaces among the good conductors 27, the conductive separators 9 and 10, and the current-collecting plates 16 and 21 are filled with a conductive binder 28.

Each of the good conductors 27 is preferably formed of a carbon material, e.g., graphite grains. Examples of materials that may be used as the conductive binder include a synthetic resin material, a conductive coating, a conductive adhesive, a conductive polymer, and the like.

If the fuel cell system is formed as described above, most of the vacant spaces between the current-collecting plates 16, 21 and the conductive separators 9, 10 can be filled with the plurality of deformed good conductors 27, and the remaining vacant spaces can be filled with the conductive binder 28, whereby the current-collecting plates 16 and 21 and the conductive separators 9 and 10 can be electrically connected to each other with a wider area. Thus, the contact resistance between the current collecting plates 16, 21 and the conductive separators 9, 10 can be reduced. In addition, the good conductors 27 are retained between the current collecting plates 16, 21 and the conductive separators 9, 10 by means of the conductive binder 28, which prevents the good conductors 27 from falling out from between the current-collecting plates 16, 21 and the conductive separators 9, 10. Therefore, it is possible to reliably maintain a smaller contact resistance.

Each of the good conductors 27 is preferably in the form of substantially spherical grains before being deformed. To dispose the granular good conductors 27 and the conductive binder 28 between the current-collecting plates 16 and 21 and the conductive separators 9 and 10 before being clamped by the bolts 25 and the nuts 26, any of the following processes (1) to (4) is adopted: (1) A conductive binder 28 is sprayed to the current-collecting plates 16 and 21 to coat them, and a powder which is an aggregate of the good conductors 27 in a particle state is sprayed to the binder 28; (2) A powder of the good conductor 27 and a conductive binder 28 are mixed together, and the resulting mixture is applied to the current-collecting plates 16 and 21; (3) After the application in the process (2), the conductive binder 28 remaining on a surface of a coat layer is removed to expose the plurality of granular good conductors 27; (4) A plurality of granular good conductors 27 are embedded in each of the current-collecting plates 16 and 21 by a filling treatment.

The current-collecting plates 16 and 21 are connected to a predetermined load 31 through conductor wires 29 and 30.

Figure 4:
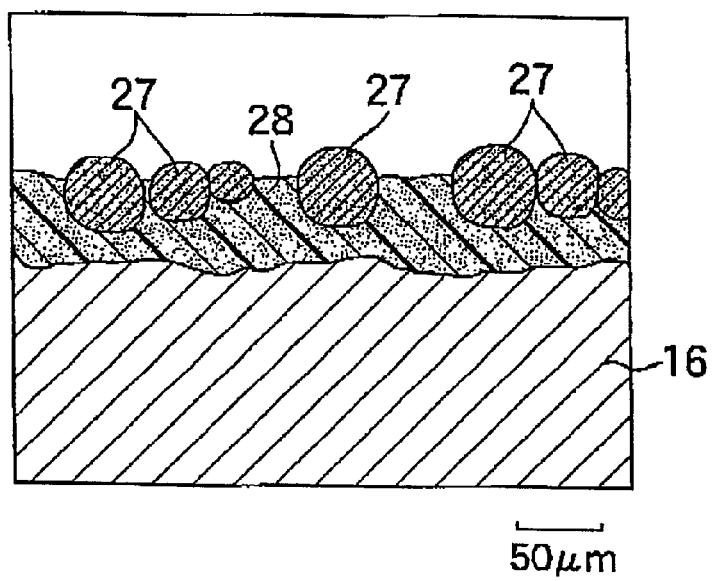
FIG. 4 is a sectional view showing the relation between a current-collecting plate, a conductive binder and graphite grains.

A particular "example 1" is now described in terms of experimental results obtained by the inventors. As shown in FIG. 4, a conductive binder 28 comprising a phenol resin containing a nickel (Ni) powder incorporated therein was sprayed to a current-collecting plate made of JIS SUS316 (which will be referred to as an SUS current-collecting plate hereinafter) 16 (or 21). Then, a powder, which is an aggregate of graphite grains 27 for good conductors, was sprayed to the binder 28, so that the amount of powder sprayed was about 20 mg/cm$^2$. Thereafter, the conductive binder 28 was thermally cured.

A particular "example 2" is now described to show additional experimental results. The conductive binder 28 comprising a phenol resin containing the nickel (Ni) powder incorporated therein was sprayed to a current-collecting plate formed of graphitized carbon (which will be referred to as a carbon current-collecting plate hereinafter) 16 and then, a powder, which is an aggregate of graphite grains 27, was sprayed to the binder 28, so that the amount of powder sprayed was equal to that described above. Thereafter, the conductive binder 28 was thermally cured.

Next, the surface having the graphite grains 27 in the example (1) and a conductive separator 9 (or 10) formed of graphitized carbon were superposed on each other and then pressed, so that a predetermined surface pressure was produced between both of them. Thereafter, a contact resistance between the example (1) and the conductive separator 9 under the surface pressure was measured.

For the example (2), a contact resistance was measured in the same manner. Further, in order to compare example 1 to example 2, a contact resistance was measured in the same manner in an example (1a) made using an SUS current-collecting plate 16 having no graphite gains 27 and no conductive binder 29. In addition, for comparison with the example (2), a contact resistance was measured in the same manner in an example (2a) made using a carbon current-collecting plate 16 having no graphite gains 27 and no conductive binder 29.

Table 1 shows exemplary results of the above-described measurements.

TABLE 1

| Current-collecting plate | Surface pressure | | | |
| --- | --- | --- | --- | --- |
| | 0.2 MPa | 0.5 MPa | 1 MPa | 2 MPa |
| Example (1) | 25 | 1.8 | 0.6 | 0.35 |
| Example (1a) | 1400 | 440 | 160 | 47 |
| Example (2) | 28 | 7 | 6.9 | 6.6 |
| Example (2a) | 36 | 25 | 24 | 23 |
| | Contact resistance ($\Omega cm^2$) | | | |

The results of the use of the graphite grains 27 can be clearly seen from Table 1. In the examples (1) and (2), if the surface pressure is 0.2 MPa, the graphite grains 28 are slightly deformed, namely, slightly crushed, but if the surface pressure is 0.5 MPa, the graphite grains 28 are more crushed and hence, the contact resistance is significantly smaller than that when the surface pressure is 0.2 MPa. Thereafter, as the surface pressure is higher, the contact resistance is smaller.

Then, examples (1) and (2) similar to those described above were fabricated using SUS current-collecting plates 16 and 21 and carbon current-collecting plates 16 and 21 having a length of 120 mm, a width of 100 mm and a thickness of 5 mm. Examples (1a) and (2a) similar to those described above were also prepared. Further prepared were conductive separators 9 and 10, whose surfaces opposed to the SUS current-collecting plates 16 and 21 and carbon current-collecting plates 16 and 21 were sized to be equal to the size of the plates 16 and 21. A fuel cell system 1 including a cell stack 2 of 100 cells was fabricated using the example (1), the conductive separators 9 and 10 and the like. In this case, the surface pressure between the example (1) structure and the conductive separator 9, 10 was 0.5 MPa, and the contact resistance was 1.8 Ωcm². For convenience, this fuel cell system 1 is called "Example 1."

Three other fuel cell systems 1 each having a structure (the surface pressure: 0.5 MPa) similar to that described above were also fabricated using the examples (2), (1a), and (2a). A fuel cell system 1 made using the example (2) is called "Example (2)"; a fuel cell system 1 made using the example (1a) is called "Example (1a)"; and a fuel cell system 1 made using the example (2a) is called "Example (2a)."

Thereafter, a power-generating performance test was carried out for each of the fuel cell systems 1, and a density of power-generating current for a generation of a power at 70 V was measured, thereby providing results shown in Table 2.

TABLE 2

| Fuel cell system | Contact resistance (surface pressure: 0.5 MPa) (Ωcm²) | Density of power-generating current on the generation of a power at 70 V (A/cm²) |
|---|---|---|
| Example (1) | 1.8 | 0.518 |
| Example (1a) | 440 | 0.415 |
| Example (2) | 7 | 0.502 |
| Example (2a) | 25 | 0.482 |

Figure 5:
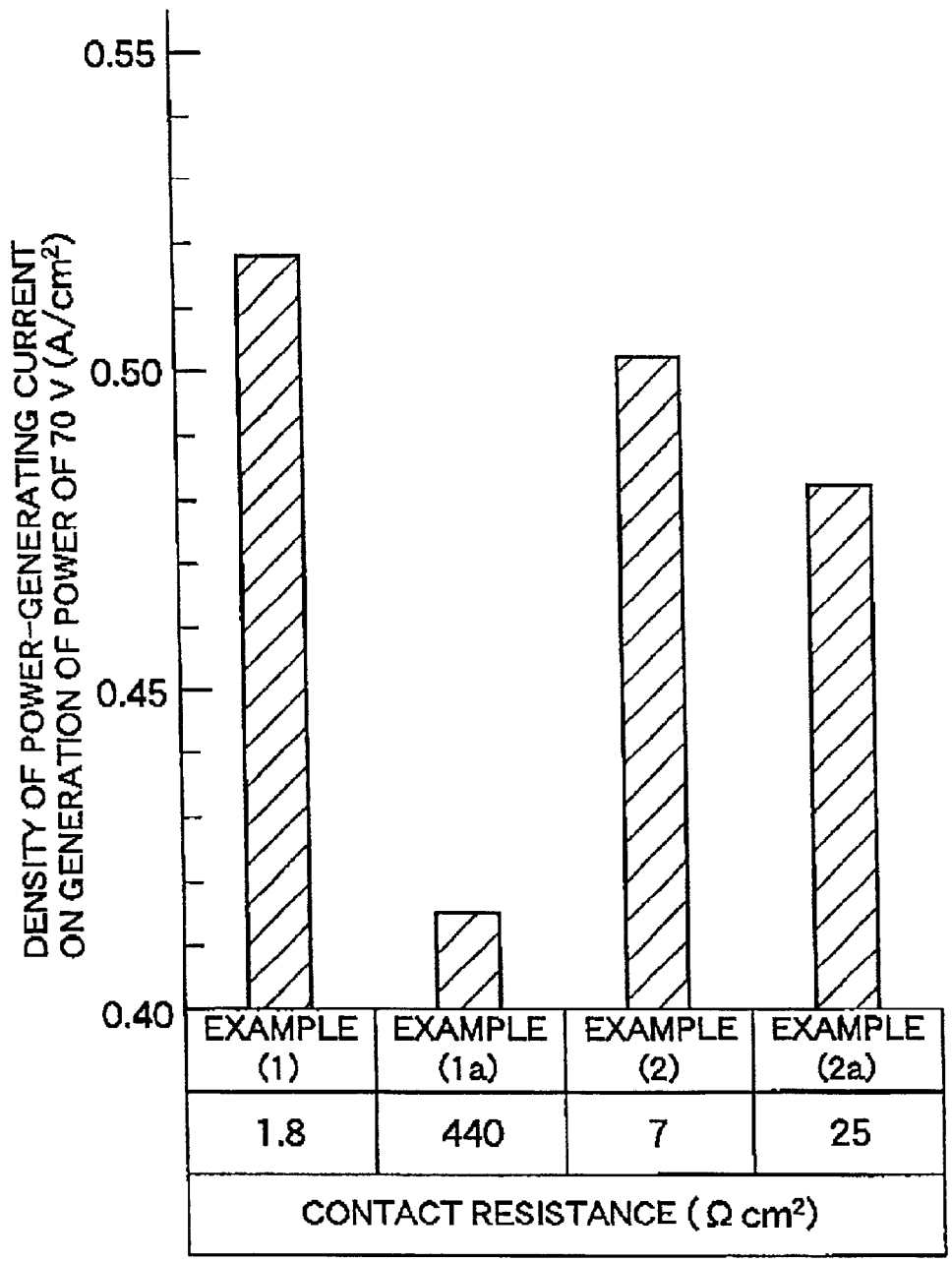
FIG. 5 is a graph showing the density of power-generating current for a power generation at a voltage of 70 V, in a fuel cell system according to an exemplary embodiment of the invention.

FIG. 5 is a graph made based on Table 2. It can be seen from Table 2 and FIG. 5 that Example (1) of the fuel cell system 1 is higher in density of power-generating current than Example (1a), leading to an enhanced power-generating efficiency, and Example (2) of the fuel cell system 1 is higher in density of power-generating current than Example (2a), leading to an enhanced power-generating efficiency.

According to the present invention, a current-collecting structure in a fuel cell system is provided, where the contact resistance between the conductive separator and the current-collecting plate can be decreased and, in turn, the power-generating efficiency of the fuel cell system can be enhanced by constructing the current-collecting structure as described above.

What is claimed is:

1. A current-collecting structure in a fuel cell system, comprising:
    a plurality of conductive separators;
    a plurality of current-collecting plates pressed toward said conductive separators;
    a plurality of good conductors dispersed between said conductive separators and said current-collecting plates, and deformed under the pressing to come into close contact with said conductive separators and said current-collecting plates; and,
    a conductive binder that fills vacant spaces among said good conductors, said conductive separators, and said current-collecting plates.

2. A current-collecting structure as claimed in claim 1, wherein said plurality of current-collecting plates are pressed inwardly toward said conductive separators.

3. A current-collecting structure as claimed in claim 1, wherein said plurality of conductive separators are each formed of graphitized carbon.

4. A current-collecting structure as claimed in claim 3, wherein said plurality of conductive separators are each of a same shape.

5. A current-collecting structure as claimed in claim 1, wherein each of said plurality of good conductors is formed of a carbon material.

6. A current-collecting structure as claimed in claim 5, wherein each of said plurality of good conductors is formed of graphite grains.

7. A current-collecting structure as claimed in claim 1, wherein said plurality of good conductors and said conductive binder are mixed together.

8. A solid polymer fuel cell system, comprising a prismatic cell stack formed of a plurality of cells, each of the cells comprising:
    a plurality of conductive separators;
    a plurality of current-collecting plates pressed toward said conductive separators;
    a plurality of good conductors dispersed between said conductive separators and said current-collecting plates, and deformed under the pressing to come into close contact with said conductive separators and said current-collecting plates; and,
    a conductive binder that fills vacant spaces among said good conductors, said conductive separators, and said current-collecting plates.

* * * * *